(12) United States Patent
Gallardo et al.

(10) Patent No.: US 10,812,614 B2
(45) Date of Patent: Oct. 20, 2020

(54) INTERMEDIATED RETRIEVAL OF NETWORKED CONTENT

(71) Applicant: Citrix Systems, Inc., Fort Lauderdale, FL (US)

(72) Inventors: Xavier Gallardo, Fort Lauderdale, FL (US); Leo C. Singleton, IV, Fort Lauderdale, FL (US); Simon Frost, Hitchin (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 351 days.

(21) Appl. No.: 15/848,442

(22) Filed: Dec. 20, 2017

(65) Prior Publication Data
US 2019/0191005 A1    Jun. 20, 2019

(51) Int. Cl.
*H04L 29/08* (2006.01)

(52) U.S. Cl.
CPC ........ *H04L 67/2861* (2013.01); *H04L 67/141* (2013.01); *H04L 67/28* (2013.01); *H04L 67/32* (2013.01); *H04L 67/327* (2013.01)

(58) Field of Classification Search
CPC ... H04L 67/2861; H04L 67/141; H04L 67/28; H04L 67/32; H04L 67/327; H04L 67/1008; H04L 67/42; H04L 45/22; H04L 45/70
See application file for complete search history.

(56) References Cited

U.S. PATENT DOCUMENTS

| | | | |
|---|---|---|---|
| 7,127,492 B1 * | 10/2006 | Calo | H04L 67/1008 709/214 |
| 2012/0131129 A1 * | 5/2012 | Agarwal | H04L 43/0852 709/216 |
| 2014/0136658 A1 * | 5/2014 | Wahler | H04W 48/18 709/218 |
| 2015/0081884 A1 * | 3/2015 | Maguire | H04L 45/70 709/224 |
| 2015/0117264 A1 * | 4/2015 | Kuo | H04L 45/22 370/255 |
| 2016/0226871 A1 * | 8/2016 | Stephure | |
| 2017/0024100 A1 * | 1/2017 | Pieper | H04L 67/42 |

\* cited by examiner

*Primary Examiner* — Joshua D Taylor
(74) *Attorney, Agent, or Firm* — Banner & Witcoff, Ltd.

(57) ABSTRACT

Methods, systems, computer-readable media, and apparatuses may provide for the intermediated retrieval of applications on a network. A computing device may be configured to receive an application from an application server on a network. Based on, for example, the network conditions between the computing device and the application server, the computing device may query a plurality of intermediary servers. Based on a decision that, for example, the network conditions between the computing device, application server, and a selected intermediary server are better than the network conditions between the computing device and the application server, the computing device may cause the application to be retrieved by a host application of the selected intermediary server. The host application may process and transmit the application to the computing device. The computing device may display the processed application and transmit user input corresponding to the processed application to the intermediary server.

20 Claims, 6 Drawing Sheets

INTERMEDIATED RETRIEVAL OF NETWORKED CONTENT

FIELD

Aspects of the disclosure relate to computer hardware and/or software. In particular, one or more aspects of the disclosure generally relate to computer hardware and software for retrieving content over a wide area network.

BACKGROUND

Modern network applications, such as Internet websites, are highly reliant on the speed of networks. For instance, a web application may make numerous calls to an application server per second, and lag time for each such call may significantly impede the application's performance. Such lag time may be compounded by distance: for example, the lag time of a request from a computer in the United States accessing a web application stored on a server in Korea may take so long as to render the application nearly unusable. There is thus an ongoing need for methods to improve the retrieval of data via a network application.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide a method of using an intermediary server to access a network application, e.g., over a wide area network.

A computing device may retrieve a network application, such as a website, from an application server. The computing device may be in one location, such as in the United States, and the application server may be in a second location, such as in Japan. The network application may be configured such that the computing device may make a large number of requests or receive a large amount of data from the application server. Similarly, the network application may be configured such that the application server may make a large number of requests or receive a large amount of data from the computing device. The computing device may analyze network conditions between the computing device and the remote sever. For instance, the computing device may determine a round-trip time associated with one or more requests made by the computing device to the application server. Based on the network conditions, the computing device may evaluate whether one or more intermediary servers may be used to better retrieve the network application. The computing device may establish a connection with an intermediary server executing a host application. The host application may be configured to retrieve the network application from the application server, process the network application (e.g., by generating a video corresponding to network application output, and/or using remote access/ virtualization protocols), and transmit the processed network application to the computing device.

The computing device and a plurality of intermediary servers may individually or jointly determine the conditions in which the host application is used by the computing device. The computing device may, for example, query a plurality of intermediary servers to determine which may provide the fastest and/or highest quality access to the application. The computing device may additionally or alternatively decide whether or not to use an intermediary server based on user preferences, a user perception of application performance, or the like.

The details of these and other features are set forth in the accompanying drawings and the description below. Other features and advantages will be apparent from the description, drawings, and from the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
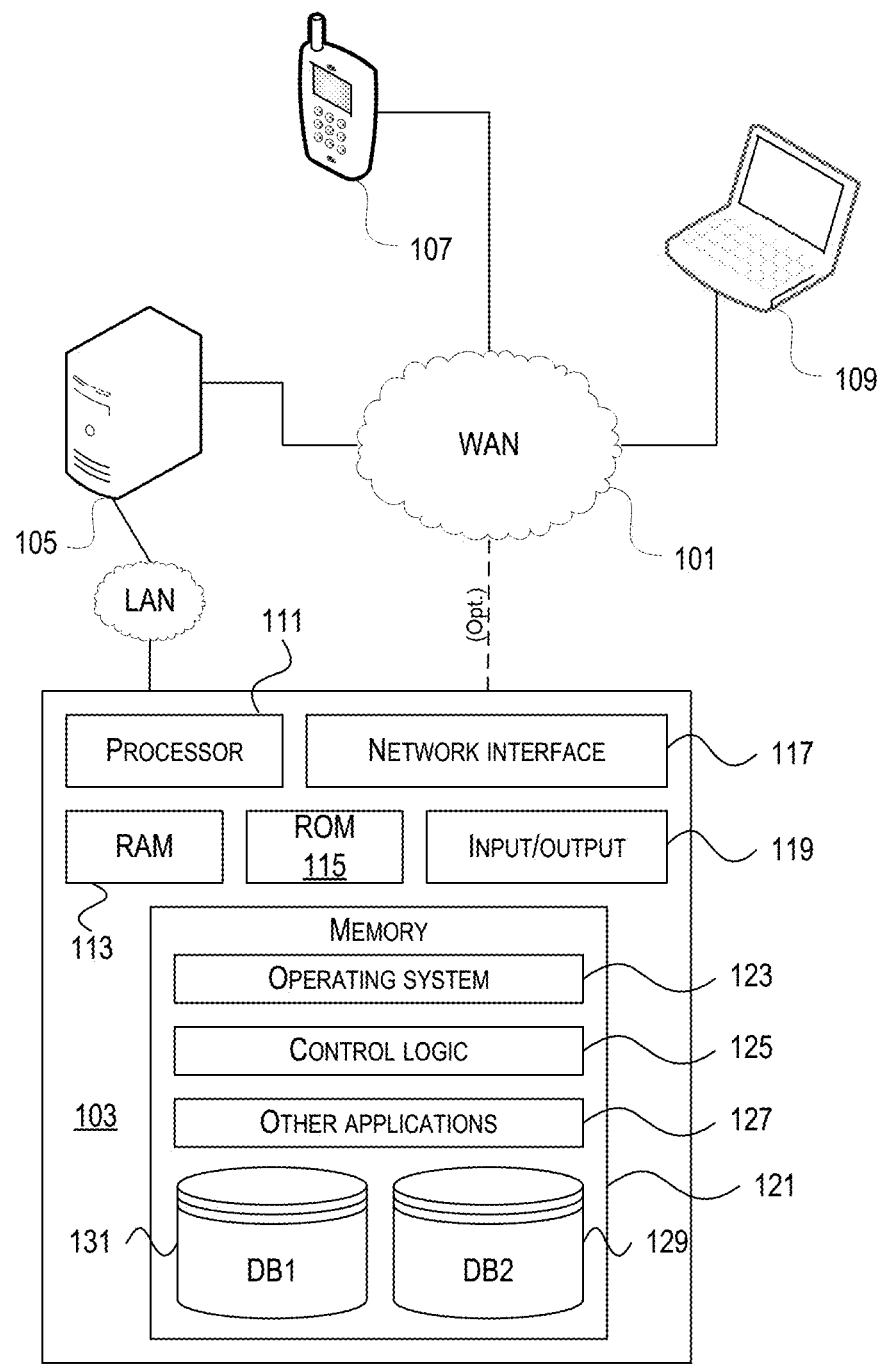
FIG. 1 depicts an illustrative computer system architecture that may be used in accordance with one or more illustrative aspects described herein.

FIG. 1 illustrates one example of a system architecture and data processing device that may be used to implement one or more illustrative aspects described herein in a standalone and/or networked environment. Computer software, hardware, and networks may be utilized in a variety of different system environments, including standalone, networked, remote-access (also known as remote desktop), virtualized, and/or cloud-based environments, among others. Various network nodes 103, 105, 107, and 109 may be interconnected via a wide area network ("WAN") 101, such as the Internet. Other networks may also or alternatively be used, including private intranets, corporate networks, local area networks (LAN), metropolitan area networks ("MAN"), wireless networks, personal networks ("PAN"), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory ("RAM") 113, read only memory ("ROM") 115, network interface 117, input/output interfaces 119 (e.g., keyboard, mouse, display, printer, etc.), and memory 121. Input/output ("I/O") 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service ("QoS"), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language ("HTML") or Extensible Markup Language ("XML"). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays ("FPGA"), and the like. Particular data structures may be used to more effectively implement one or more aspects described herein, and such data structures are contemplated within the scope of computer executable instructions and computer-usable data described herein.

Figure 2:
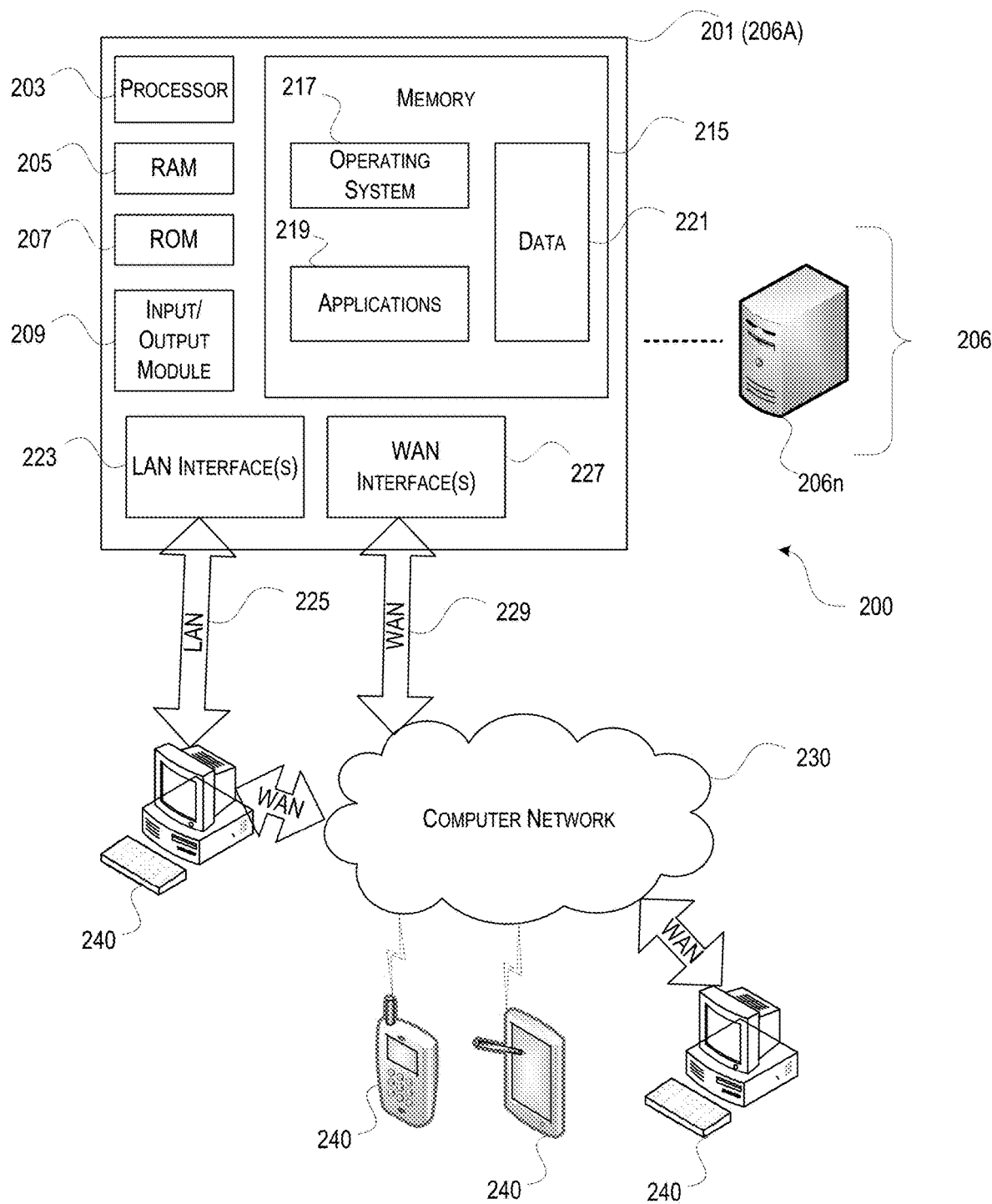
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output ("I/O") module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network ("LAN") 225 and a wide area network ("WAN") 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers ("PCs"), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture ("ICA") protocol developed by Citrix Systems, Inc. of Ft. Lauderdale, Fla.; or the Remote Desktop Protocol ("RDP") manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer ("SSL") VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
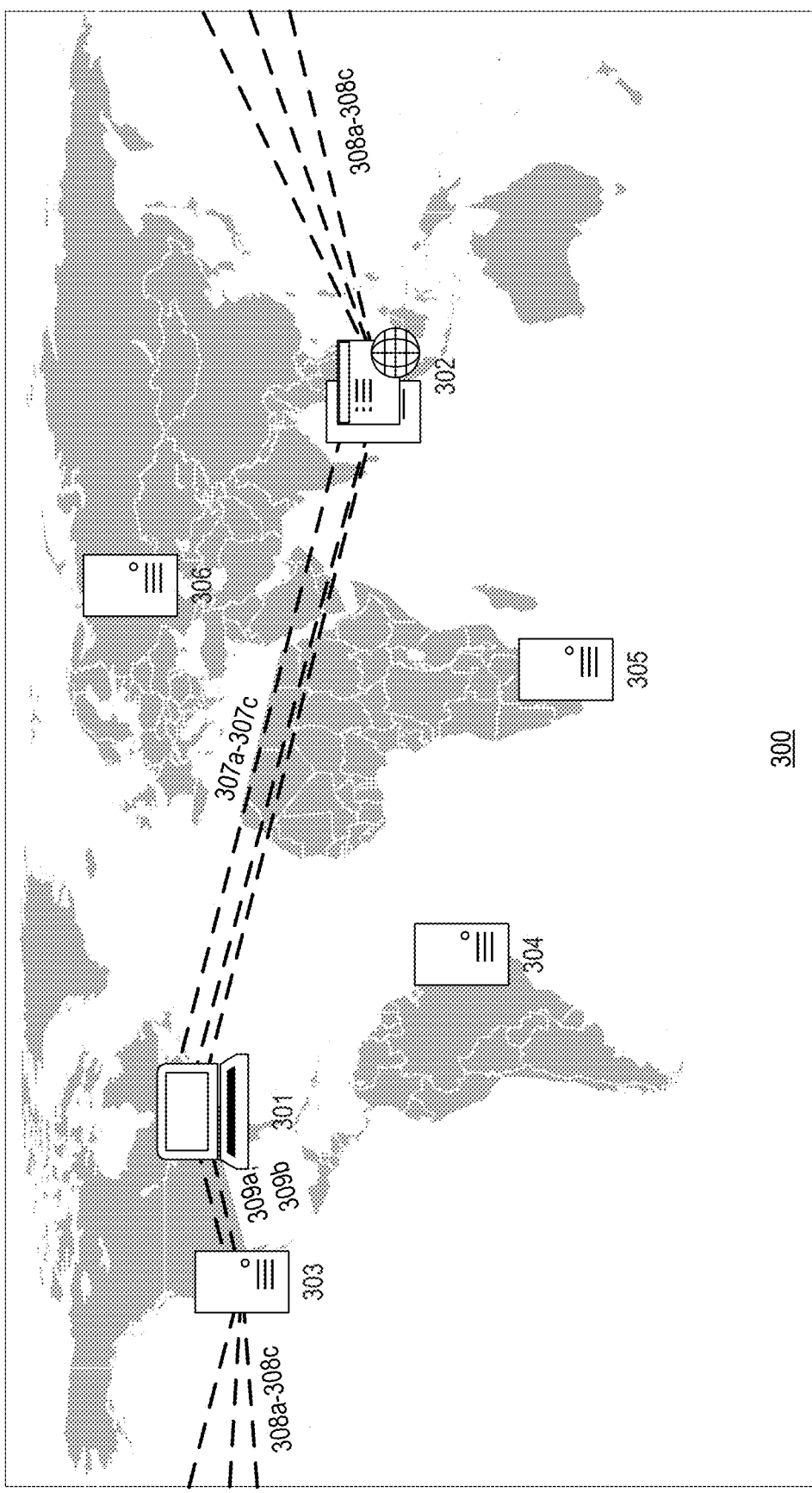
FIG. 3 illustrates a global network upon which aspects described herein may be implemented, comprising a computing device, a plurality of intermediary servers, an application server, and communications between such devices.

FIG. 3 illustrates one or more aspects of intermediated retrieval of applications using illustrative intermediary servers located across the globe. FIG. 3 depicts a world map 300 for illustrative purposes: aspects described herein need not be performed on a global scale. For example, aspects described herein may be performed in any geographic area, building, an office, or the like.

For illustrative purposes, FIG. 3 depicts a computing device 301 located in New York City, an application stored on an application server 302 located in Singapore, an intermediary server 303 located in California, an intermediary server 304 located in Brazil, an intermediary server 305 located in South Africa, and an intermediary server 306 located in Russia. These locations are provided for illustrative purposes: computing device 301, application server 302, and any intermediary server 303-306 may be located anywhere in the world and any distance from one another. FIG. 3 also depicts communications 307a-307c, intermediated communications 308a-308c, and intermediary server communications 309a-309c. Such communications may be made on a network (not pictured) connecting computing device 301, application server 302, and intermediary servers 303-306. While only seven communications are depicted as communications 307a-307c, 308a-308c, and 309, any number of communications may be made between computing device 301, intermediary servers 303-306, and application server 302.

Computing device 301 may be any type of computer, server, or data processing device which may execute an application stored on application server 302. For example, computing device 301 may be a personal computer such as a laptop, a smartphone, a set-top box, or the like. Computing device 301 may have one or more interfaces through which it may access one or more networks, such as an Ethernet connection to the Internet. Computing device 301 may have one or more input mechanisms by which a user may use an application. For example, computing device 301 may be a smartphone with a mobile data connection and a touchscreen for input which may retrieve a mobile-ready web application from application server 302.

Application server 302 may be any computer, server, or data processing device configured to store and transmit an application. For example, application server 302 may be web server executing APACHE HTTP SERVER software by the Apache Software Foundation of Forest Hill, Md. Application server 302 may additionally or alternatively be a game server, such as a server configured to deliver multi-player game content to a client game application. For simplicity application server 302 is referred to as a single entity in this disclosure; however, application server 302 may be a plurality of computing devices, such as a content delivery network.

The application stored on application server 302 may be any application which may be remotely executed by computing device 301. The application may be configured receive input or content from and to transmit code or output to computing device 301. For example, the application may comprise an interactive menu executable by a web browser on computing device 301. As another example, the application may be video game content stored on an application server and executable using a game client application by computing device 301. Though called an application, some or all of the application may be static or otherwise lack interactivity. For example, the application stored in application server 302 may be a website, animation, movie, text content, or the like.

The application stored on application server 302 may be processed and/or executable in part at application server 302 and processed and/or executable in part on computing device 301. For example, a web application may comprise Python programming language executed at application server 302 and HTML code processed and displayed by computing device 301. Application server 302 may transmit to computing device 301 code which may be executed by computing device 301.

Intermediary servers 303-306 may be any computing devices connected to a network and configured to execute a host application (not pictured). A host application may be any program configured to retrieve an application, such as an application hosted on application server 302, process the application, and transmit content corresponding to the application to computing device 301. Processing may comprise rendering an application locally (e.g., on the intermediary server 303-306). For example, a host application executing on an intermediary server 303-306 may retrieve an application, execute and render it locally, and transmit video and audio corresponding to the locally executing application to computing device 301. As another example, processing may comprise compressing a received application into a smaller file size or the like.

An example of network conditions which may merit use of an intermediary server is provided herein. A computing device in New York City may access an application hosted on an application server located in Seoul. The network between New York City and Seoul may be limited such that, while large amounts of data may be transmitted, the round-trip time of a single request may be significant due to distance. A first intermediary server in San Francisco may have a significantly smaller round trip time for requests made to the application server in Seoul. A second intermediary server in Juneau may have a significantly longer round trip time for requests made to the application server in Seoul because, though it is closer to Seoul than San Francisco is, the network conditions in Juneau may be limited (e.g., due to network congestion or the like). The computing device may test the speed in which the intermediary servers access an application, process the application, and transmit the application to the computing device, compare the tested speed against the computing device's speed of retrieval of the application directly, and ultimately retrieve the application through the hosted browser on the San Francisco intermediary server.

As illustrated in FIG. 3, computing device 301 may communicate with application server 302 through a variety of communications 307a-307c. As used herein, communications may be any form of communication over any network and using any network protocol, such as a request and/or response from computing devices such as computing device 301, intermediary servers 303-306, and/or application server 302. Communications may be made via one or more routers, switches, or similar devices, and may be made over one or more networks, such as the Internet. For example, communication 307a may comprise a request for an HTML file, communication 307b may comprise a response providing the HTML file, and communication 307c may comprise a request for an image file. A communication may additionally or alternatively be a command, data, or any other form of exchange between computing devices such as computing device 301, intermediary servers 303-306, and/or application server 102. For example, communications 309a-309b between computing device 301 and intermediary server 303 may comprise an indication of input commands from computing device 301 for use in the application executing on intermediary server 303. Because computing device 301 and application 302 may be geographically distant, among other reasons, there may be a significant delay between transmission and receipt of a communication. For instance, the request for an image file 307c may take four seconds to complete, though the image file itself may download in less than a second.

Computing device 301 may alternatively communicate with application 302 via intermediary server 303. Intermediary server 303 may execute application 302 using communications 308a-308c. Communications 307a-307c and communications 308a-308c may be the same or substantially similar such that application 302 may function the same regardless of whether it is being executed by computing device 301 or intermediary server 303. For instance, if the application stored on application server 302 is a web application, whether or not computing device 301 or intermediary server 303 retrieves the application, the application may be retrieved using similar Hypertext Transfer Protocol ("HTTP") protocol processes. Intermediary server 303 may execute a host application which executes the same or similarly to a client application, such as a web browser, executing on computing device 301. For example, if computing device would execute the application received from application server 302 using a web browser, the host application may be a hosted web browser. As another example, the application stored on application server 302 may be a video game, and the host application executing on intermediary server 303 may be configured to emulate a game client executing on a personal computer and transmit game output (e.g., video and audio) to computing device 301.

Computing device 301 may communicate with intermediary server 303 via one or more communications 309a-309b. Communications 309a-309b may be different than communications 307a-307c, 308a-308c: for example, communications 309a-309b may be for video and audio streams representing an application executing on intermediary server 303, or may be input commands transmitted from computing device 301 to intermediary server 303. In this manner, the quantity of communications between computing device 301 and intermediary server 303 may, but need not, be fewer than the quantity of communications between intermediary server 303 and application 302. Communications 309a-309b need not have a smaller bandwidth or round-trip time than communications 308a-308c. For instance, the overall speed of communications 308a-308c and 309a-309b may be better than the overall speed of communications 307a-307c even though some network conditions of communications 307a-307c (e.g., bandwidth) may be superior to some network conditions of communications 308a-308c, 309a-309b.

Computing device 301 may determine whether to communicate directly with application server 302 (e.g., via communications 307a-307c) or with application server 302 via an intermediary server (e.g., via communications 308a-308c, 309a-309b and via intermediary server 303) based on considerations such as the speed and reliability of such communications. Computing device 301 may initially retrieve an application from application server 302 directly (e.g., via communications 307a-307c). That application, or a second application executing on computing device 301 (e.g., a web browser plugin), may, for example, detect that the round trip time, bandwidth, or other network performance characteristics of communications between computing device 301 and application server 302 meet a threshold. In response, the second application executing on computing device 301 may transmit a communication (e.g., communication 309a) to a plurality of intermediary servers (e.g., intermediary servers 303-306) to determine whether accessing the application via one of the intermediary servers would improve application performance or other parameters associated with the application. Based on determining that at least one of the intermediary servers would improve, for example, application performance, computing device 301 may cause an intermediary server (e.g., intermediary server 303) to retrieve the application from application server 302 (e.g., via communications 308a-308c), process the application, and send a representation of the executing application (e.g., a video/audio stream via communication 309b) to computing device 301.

Computing device 301 may additionally or alternatively determine whether to communicate directly with application server 302 (e.g., via communications 307a-307c) or with application server 302 via an intermediary server (e.g., via communications 308a-308c, 309a-309b and via intermediary server 303) based on user input. As with the above, computing device 301 may detect that the round trip time, bandwidth, or other network performance characteristics of communications between computing device 301 and application server 302 meet a threshold. Computing device 301 may determine second round trip time, bandwidth, or other network performance characteristics of communications between computing device 301 and an intermediary server and between an intermediary server and application server 302. Computing device 301 may then compare the two network performance characteristics (e.g. comparing round-trip times, bandwidth, other network performance characteristics, or a combination thereof). This comparison process may be conducted regularly, e.g. every five minutes. Computing device 301 may prompt a user to switch (e.g. as an option, like "Would you like to use a hosted browser?," or as a notification, like "This connection would be better if you used a hosted browser"). Such a prompt may be based on the comparison of network performance characteristics, may contain information about the network performance characteristics, and the like. The prompt may allow the user to either continue using the direct connection between computing device 301 and application server 302 or to establish a connection with application server 302 via an intermediary server. Such a prompt may be sent by, for instance, a web browser plugin or similar program executing on computing device 301. In response to an indication, by the user, to establish a connection with the intermediary server, computing device 301 may cause an intermediary server (e.g., intermediary server 303) to retrieve the application from application server 302 (e.g., via communications 308a-308c), process the application, and send a representation of the executing application (e.g., a video/audio stream via communication 309b) to computing device 301.

An illustration of one implementation of the above devices is provided herein. A user in Japan may access, using a personal computer, a web application hosted on a U.S. server in New York. The web application may be interactive such that hundreds of communications per minute are made between the personal computer in Japan and the server in New York. While the user's personal computer may have an Internet connection which is suitable for the download of large amounts of data, the distance between the server in New York and the personal computer in Japan may significantly delay all communications, even for the smallest amount of data. The user's computer may determine that the round-trip time of the requests is unacceptably high, which may be perceived by the user as excessive lag or as application errors. The user's computer may evaluate the network speed of various intermediary servers located worldwide to determine if at least one of the intermediary servers can retrieve the web application faster. The user's computer may establish a connection with an intermediary server in California. The intermediary server in California may execute a host application. The host application may access the application on the New York server, process the application by rendering and converting the application into, for example, a video stream or remote access session, and transmit the video stream to the personal computer in Japan. The stream may be compressed or optimized in a manner which allows best transmission from the intermediary server in California to the personal computer in Japan. The host application may receive input from the computing device in Japan and transmit such input to the application. The user in Japan may thereby have a substantially similar experience through the host application as if the application were retrieved directly.

Figure 4:
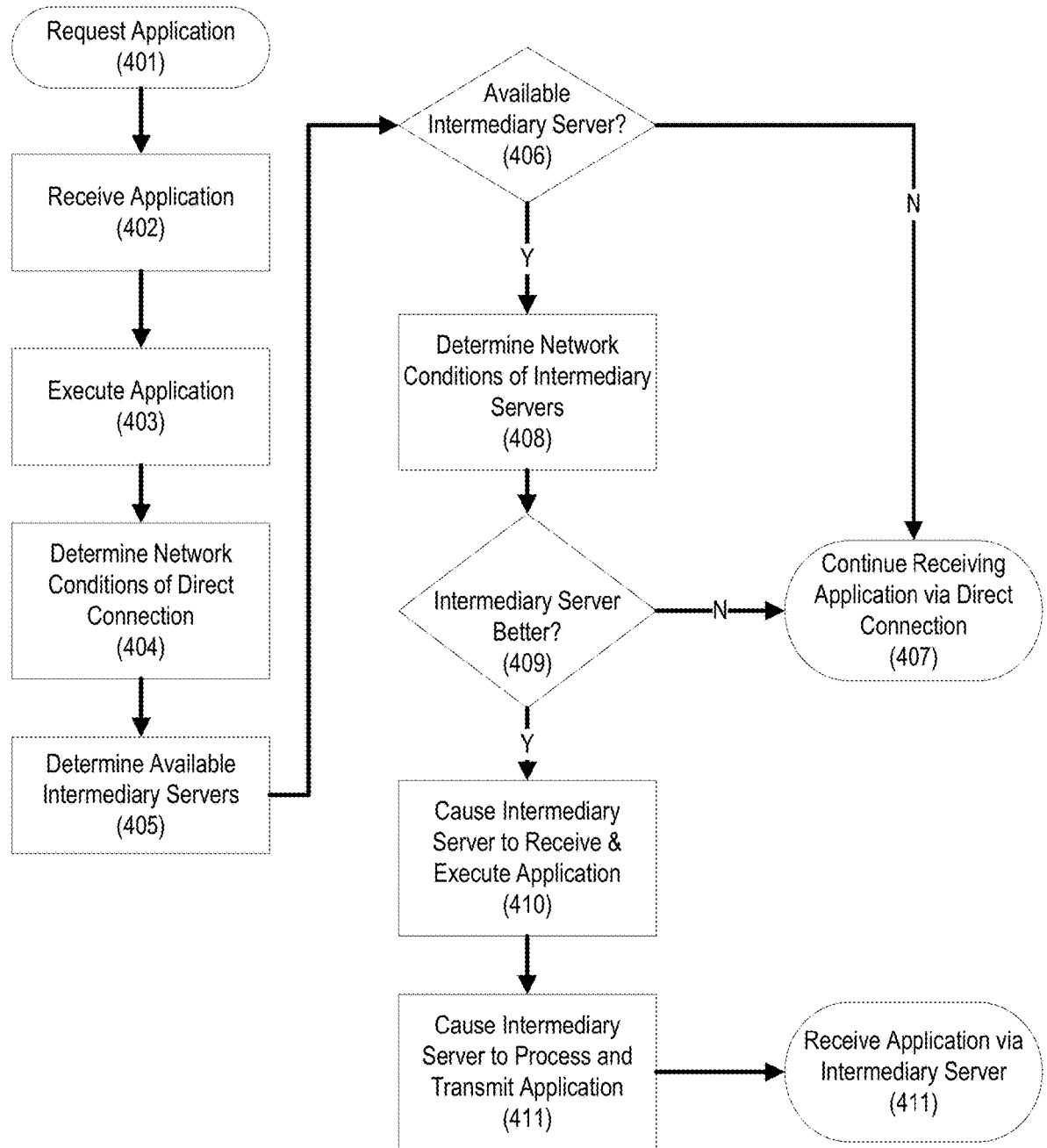
FIG. 4 illustrates a flowchart of processes which may be taken by a computing device in accordance with one or more illustrative aspects described herein.

FIG. 4 is an illustrative flow chart depicting steps which may be taken by computing device 301 in accordance with one or more features of this disclosure.

In step 401, computing device 301 may request an application from application server 302. The request may be any appropriate application request based on the network protocol(s) connecting computing device 301 and application server 302. For instance, if the application is a web application, the request may be an HTTP request for the web application.

In step 402, computing device 301 may receive the application from application server 302. The format in which the application is received may depend on the protocol used and the method of executing the application. For instance, if the application is a web application, the application may be received in an HTML format with corresponding Cascading Style Sheet ("CSS") files and JavaScript files. As another example, if the application may be an executable file, such as an .exe file, computing device 301 may receive an entire .exe file. As noted above, it is not necessary that computing device 301 receive all of the application stored at application server 302. For instance, the application may comprise a first portion configured to execute at computing device 301 and a second portion configured to execute at application server 302.

In step 403, computing device 301 may execute the application Like requesting and receiving the application in steps 401 and 402, the execution of the application may depend on the protocols used and other considerations. Executing the received application may comprise rendering content. For instance, of the application is a website, the application may be executed by rendering a received HTML file in a web browser.

In step 404, computing device 301 may determine network conditions of the connection between computing device 301 and application server 302. The network conditions may be any measurement corresponding to the communications between computing device 301 and application server 302, including a measurement of bandwidth, latency, jitter, round-trip time, or the like. Computing device 301 may determine network conditions based on receiving the application in step 402: for example, computing device 301 may measure the round-trip time of the request in step 401 and the download speed when receiving the application in step 402. Computing device may additionally or alternatively determine network conditions by requesting and retrieving a file (e.g., an image or video file) or other transmission from application server 302. Computing device 301 may constantly determine network conditions for the connection between computing device 301 and application server 302 by, for example, retrieving a small image file every 40 seconds and measuring the latency, round trip time, and bandwidth. Network conditions of the connection between computing device 301 and application server 302 may be stored in memory and analyzed by computing device 301. Computing device 301 may, for instance, determine that the connection between itself and application server 302 unstable such that, while a most recent measurement of communication latency may be low, the average latency over a time period is high.

In step 405, computing device 301 may determine one or more intermediary servers 303-306 available to computing device 301. Computing device 301 may store a list of intermediary servers from which such a determination may be made or may query one or more databases or servers to determine a list of intermediary servers. Determining one or more intermediary servers may include communicating with one or more intermediary servers to, for example, determine whether an intermediary server is online, available bandwidth/processing facilities of the intermediary server, or the like. For example, if an intermediary server is online but too busy to handle additional requests, computing device 301 may treat the intermediary server as unavailable. Similarly, if bandwidth between computing device 301 and the intermediary server meets a threshold (e.g., is so low as to be essentially unusable), then computing device 301 may treat the intermediary server as unavailable. As another example, computing device 301 may query intermediary servers to determine which may provide the highest quality (e.g., resolution, framerate, etc.) video stream corresponding to the application at application server 302.

Step 406 inquires whether at least one intermediary server is available. If not, then computing device 301 may proceed to step 407 and continue receiving the application via the connection directly connecting computing device 301 and application server 302.

If at least one intermediary server is available in step 406, then computing device may, in step 408, determine the network conditions of the intermediary server(s). Like step 404, network conditions may be any measurement corresponding to the communications between computing device 301, application server 302, and/or the intermediary server(s), including a measurement of bandwidth, latency, jitter, round-trip time, or the like. And, as with step 404, determining the network conditions of an intermediary server may entail requesting and retrieving a file (e.g., an image or video file) or other transmission from or to an intermediary server and measuring the network conditions corresponding to the file. The method of determining network conditions in step 408 need not be the same method as in 404, as different processes may be available: for example, an intermediary server may be capable of estimating network conditions for computing device 301 based on other network conditions corresponding to different computing devices in the same or a similar location.

Computing device 301 may additionally or alternatively query an intermediary server for network conditions stored at the intermediary server, including current and/or historical bandwidth, latency, jitter, round-trip time, or the like. Similarly, intermediary servers may query other intermediary servers for stored network conditions, and intermediary servers may be configured to respond to such requests with historical and/or current network conditions. For example, an intermediary server queried by computing device 301 may determine its own network conditions, query other intermediary servers for their network conditions, and transmit network conditions for both itself and other intermediary servers to computing device 301.

Step 408 may be performed entirely or in part by one or more intermediary servers. Computing device 301 may transmit a request for intermediary server to, using its hosted browser, retrieve at least a portion of an application stored at application server 302. The intermediary server may, based on this retrieval, measure the network conditions—e.g., bandwidth, latency, jitter, round trip time, or the like—of the retrieval of the at least a portion of the application.

Computing device 301 may, in step 408, determine two sets of network conditions: the network conditions of the connection(s) between computing device 301 and the intermediary server, and the network conditions of the connection(s) between the intermediary server and application server 302. Computing device 301 may analyze this information to determine network conditions from application server 302 to computing device 301 via the intermediary server. For example, computing device 301 may add values of the network conditions associated with the connection between computing device 301 and an intermediary server with values of the network conditions associated with the connection between the intermediary server and application server 302.

Network conditions may be weighted. For example, if an application retrieved via an intermediary server is anticipated to require a significant number of communications, the round-trip time of the connection between an intermediary server and application server 302 may be weighted as more highly than the round-trip time between the intermediary server and computing device 301.

The network conditions measured in steps 404 and 408 may be specific to the nature of the communications between computing device 301, application server 302, and intermediary servers 303-306. The network conditions measured for communications directly between computing device 301 and application server 302 (e.g., communications 307a-307c) may be based on the nature of communications exchanged by computing device 301 and application server 302 during execution of the application. For example, if the application, when executed, makes a large number of HTTP "GET" commands, HTTP "GET" command network conditions may be determined. Similarly, the network conditions measured for communications between computing device 301 and intermediary servers may be determined based on the nature of communications made between computing device 301 and an intermediary server during execution of a host application. For example, if the host application transmits a video stream corresponding to the application from application server 302 to computing device 301, then network conditions corresponding to video streaming may be determined.

In step 409, computing device 301 may evaluate whether the network conditions of at least one intermediary server are superior to those offered by directly retrieving an application from application server 302. Examples of considerations which may be made by computing device 301 in determining whether or not at least one intermediary server is superior are provided below.

Computing device 301 may select connections (e.g., 308a-308c, 309a-309b) to application server 302 via an intermediary server (e.g., intermediary server 303) over a direct connection (e.g., connections 307a-307c) based on the round-trip time between the application and the intermediary server. The application at application server 302 may require a large number of communications between a device executing the application and application server 302 and, thus, round-trip time may significantly impede use of the application.

Computing device 301 may select connections (e.g., 308a-308c, 309a-309b) to application server 302 via an intermediary server (e.g., intermediary server 303) over a direct connection (e.g., connections 307a-307c) based on bandwidth available via the intermediary server. The connections available via the intermediary server (e.g., connections 308a-308c, 309a-309c) may have significantly more bandwidth available overall than the connections available directly (e.g., connections 307a-307c). Similarly, an intermediary server may be configured to cache information associated with application server 302 or computing device 301 such that the application may be retrieved and/or displayed more quickly than if retrieved directly.

Computing device 301 may select connections (e.g., 308a-308c, 309a-309b) to application server 302 via an intermediary server (e.g., intermediary server 303) over a direct connection (e.g., connections 307a-307c) based on preferences provided by the user of computing device 301, an administrator of application server 302, or an administrator of an intermediary server. Computing device 301 may always elect to use (or not use) one or more intermediary servers based on user preferences. An intermediary server may refuse to allow certain computing devices (e.g., computing devices associated with a specific user account, Internet Service Provider, geographic location, or the like) to access the intermediary server, or may relegate such computing devices to a specific configuration of the host application (e.g., a lower/higher resolution, a lower/higher priority, a lower/higher bandwidth, etc.). Application server 302 may be configured to detect and reject access from intermediary servers for security concerns or the like. User preferences may further specify, for example, that an application from an intermediary server is to open on a different computing device than the one requesting the application.

Computing device 301 may select connections (e.g., 308a-308c, 309a-309b) to application server 302 via an intermediary server (e.g., intermediary server 303) over a direct connection (e.g., connections 307a-307c) based on historical use of the intermediary server over time. Computing device 301, an intermediary server, or the application server 302 may determine that, during a certain time period, for certain applications, or the like, that an intermediary server is used to access an application. For example, computing device 301 may detect the need to use an intermediary server to access an application during busier work hours, when bandwidth may be less readily available. As another example, computing device 301 may determine, based on its location, to use or not use an intermediary server.

If computing device 301 determines that no intermediary server provides a connection to application server 302 better than the direct connections (e.g., connections 307a-307c) available, then computing device 301 may continue receiving the application via the direct connections in step 407.

If computing device 301 determines to use an intermediary server, in step 410, computing device 301 may cause the intermediary server to receive and execute the application from application server 302. Computing device 301 may transmit to the intermediary server (e.g., intermediary server 303) an indication to receive and execute the application from application server 302. Computing device 301 may further transmit authentication information, session information, or other data required by the intermediary server or necessary to retrieve the application from application server 302. For instance, computing device 301 may transmit a request to retrieve the application along with authentication information for the intermediary server. Computing device 301 may transmit state, session, or other such information which may enable intermediary server 303 to mimic the current form of the application executing on computing device 301 in the host application.

In step 411, computing device 301 may cause the intermediary server to process and transmit the application executing on the intermediary server. The transmission from the intermediary server to computing device 301 may use a different protocol than the transmission from application server 302 to the intermediary server. For instance, application server 302 may send the intermediary server an executable file (e.g., an .exe file) over the HTTP protocol, whereas the intermediary server may transmit a video and/or audio stream of the executing application over a media protocol.

To retrieve, process, and/or transmit the application from application server 302, an intermediary server may execute and use a host application. The host application may comprise any application designed to retrieve and execute an application, process the application, and transmit the processed application and/or a representation of the application (e.g., an image of the application or a portion of application data) to computing device 301. Processing and transmitting the application may comprise executing the application, capturing video and/or audio data corresponding to the executing application, and transmitting the video and/or audio data to computing device 301. For instance, if the application is a single-page web application and application server 302 is a web server, the host application may be a web browser configured such that a video and audio stream of the single-page web application is generated at the intermediary computing device and transmitted to computing device 301. Additionally or alternatively, the intermediary server may compress the application and transmit the compressed application to computing device 301. In the example provided above, the video and audio stream of the single-page web application may be compressed before delivery to computing device 301. As another example, an intermediary server may receive an application from application server 302, compress portions of the application, and send the compressed version application to computing device 301.

In step 411, computing device 301 may receive the application from the intermediary server. The format of the application received from the intermediary server need not be the same as the former originally received by computing device 301 directly from application server 302. Computing device 301 may execute one or more second applications in order to receive, display, process, or perform other operations on the application received from the intermediary server. The format of the application received by computing device 301 may be based on the capabilities of computing device 301. For instance, the resolution of the application may be formatted based on the screen resolution of a smartphone.

Additionally or alternatively, a second computing device may receive the application from the intermediary server. For instance, computing device 301 may be a smartphone, and the application may be transmitted to a laptop. In this manner, an intermediary server may limit which devices receive transmissions from the host browser (e.g., if the speed benefits may not be realized unless received by a computer with sufficiently fast processing capabilities). As another example, a user may transmit a request for an application via their smartphone and access a representation of the application via their personal computer.

During receipt of the application in step 411, computing device 301 and the chosen intermediary server may exchange communications. Computing device 301 may receive input information from a user and transmit such input to the intermediary server, which may replicate such input. Computing device 301 may have changing capabilities (e.g., more or less processing resources or network resources for receiving the processed application) and the intermediary server may modify the application in response to such changing capabilities.

Figure 5:
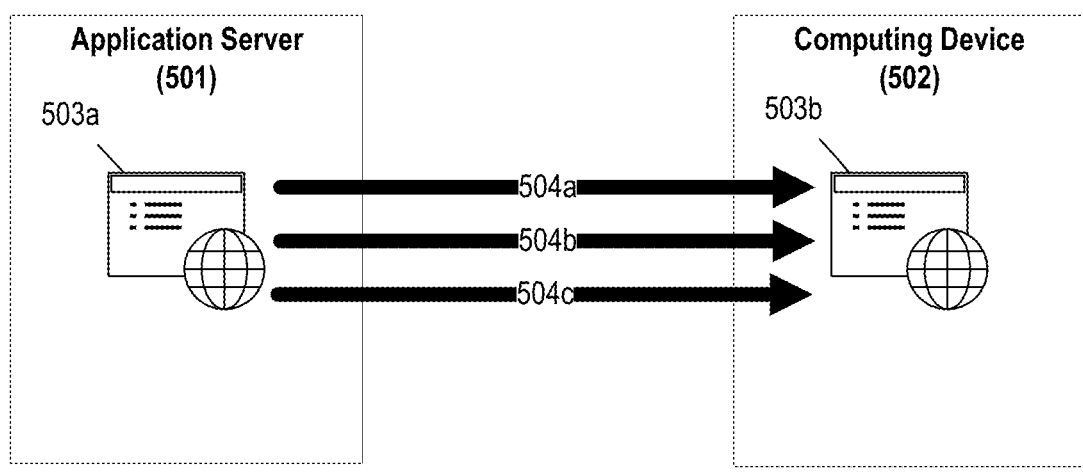
FIG. 5 illustrates direct retrieval of an application from an application server.

FIG. 5 depicts retrieval of an application from application server 501 by computing device 502. Application 503a may directly, via one or more communications 504a-504c, be received by computing device 502 as application 503b. As detailed above, applications 503a and 503b may be different. For example, application 503a may be a web application comprising HTML, CSS, and Python components (e.g., application 503a) such that application server 501 may retain and execute the Python components and computing device 502 may receive and execute the HTML and CSS components (e.g., application 503b). While communications 504a-504c in FIG. 5 (and communications 307a-307c in FIG. 3) may be referred to as direct in this disclosure, they may be interrupted or otherwise handled by a number of routers, switches, or the like.

Figure 6:
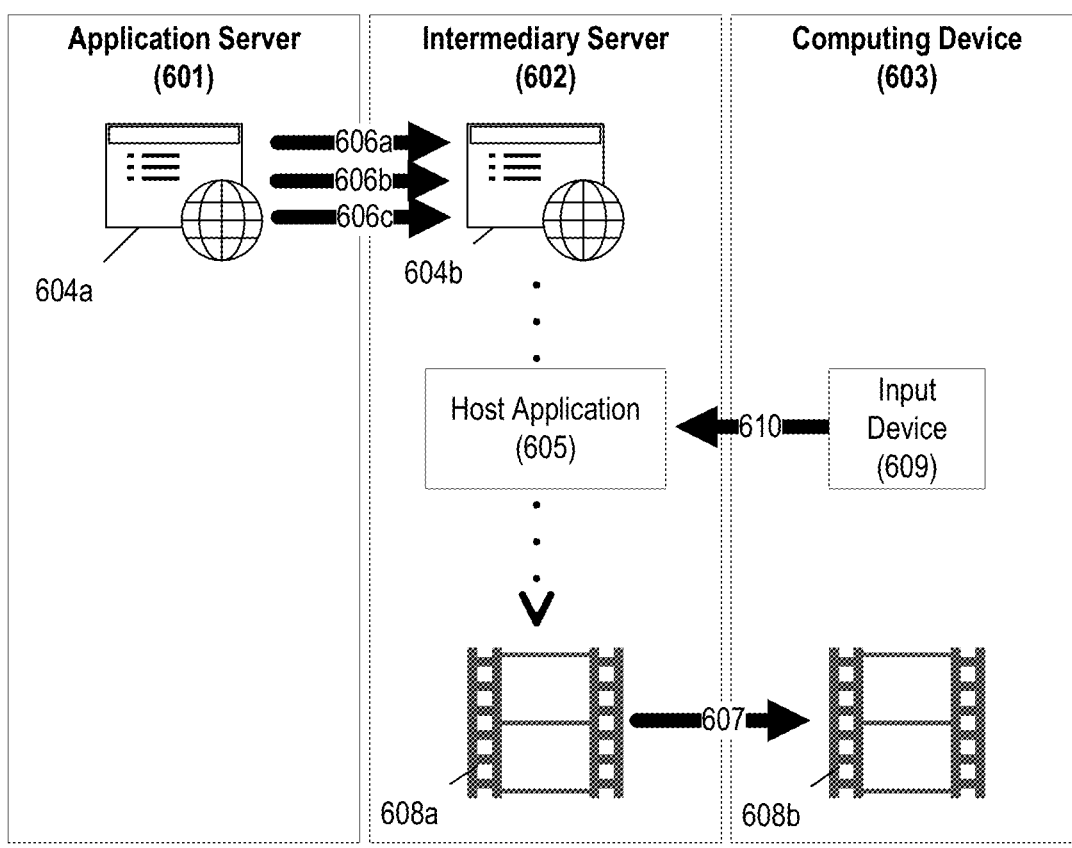
FIG. 6 illustrates intermediated application retrieval from an application server via an intermediary server.

FIG. 6 illustrates intermediated application retrieval from application server 601 through intermediary server 602 executing host application 605 and to computing device 603. Based on a request by computing device 603 (e.g., step 410 in FIG. 4), intermediary server 602 may retrieve from application server 601 application 604b via communications 606a-606c. As with FIG. 5, applications 604a and 604b may be different such that, for example, application 604b may be a subset of application 604a. Intermediary server 602 may render and/or process application 604b using host application 605. As detailed above, the host application may be configured to receive (e.g., via communications 606a-606c), process, and transmit (e.g., communication 607) application 604b. The nature of the processing may depend on the nature of the application 604b received. For example, if application 604b is a web application, host application 605 may be a host browser configured to render and convert to video/audio the web application. If application 604b is a personal computer executable, such as a program executable on the WINDOWS operating system by Microsoft Corp. of Redmond, Wash., the host application 605 may cause application 604b to be executed on intermediary server 602, capture video and audio content from the executing application (e.g., by screen recording, capturing window data, or the like), and transmit the video or audio content to computing device 603. As yet another example, application 604b may be a spreadsheet application, host application 605 may be configured to remove all content except for the spreadsheet data (e.g., the content within and formatting of each column/row) and transmit the raw data (e.g., in a Comma Separated Value ("CSV") format) to computing device 603. Intermediary server 602 may then transmit the processed form of the application 608a to computing device 603. While processed applications 608a and 608b are depicted as video in FIG. 6, the particular format of processed applications 608a and 608b may differ. For example, as indicated above, processed applications 608a, 608b may be CSV content. Processed applications 608a, 608b may be different at least because computing device 603 may further process processed application 608b for display. For instance, if processed application 608b is streaming video and audio content, computing device 603 may process the content to fit a screen resolution or the like. Computing device 603 may transmit input from input device 609 back to the intermediary server and the host application by one or more communications 610.

While FIG. 6 depicts fewer communications between intermediary server 602 and computing device 603 than between application server 601 and intermediary server 602, any number of communications may be made between application server 601, intermediary server 602, and/or computing device 603. As discussed above, computing device 603 may make a decision to use an intermediary server for a variety of reasons relating to, for example, network conditions between application server 601, intermediary server 602, and/or computing device 603.

One or more aspects of the disclosure may be embodied in a computer-usable media and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays ("FPGA"), and the like. Particular data structures may be used to more effectively implement one or more aspects of the disclosure, and such data structures are contemplated within the scope of computer executable instructions and computer-usable data described herein.

Aspects of the disclosure have been described in terms of examples. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned examples may be utilized alone or in combination or sub-combination with elements of the other examples. For example, any of the above described systems and methods or parts thereof may be combined with the other methods and systems or parts thereof described above. For example, the steps shown in the figures may be performed in other than the recited order, and one or more steps shown may be optional in accordance with aspects of the disclosure. It will also be appreciated and understood that modifications may be made without departing from the true spirit and scope of the present disclosure. The description is thus to be regarded as illustrative instead of restrictive on the present disclosure.

We claim:
1. A method comprising:
comparing, by a computing device executing an application, first network conditions and second network conditions, wherein the first network conditions correspond to a first communication between the computing device and an application server, and wherein the second network conditions correspond to:
a second communication, using a remote access protocol, between the computing device and an intermediary server, and
a third communication, using a first protocol different from the remote access protocol, between the intermediary server and the application server;
in response to determining, based on the comparing, that a performance characteristic of the application would be improved by executing the application in a remote access session on the intermediary server:
causing the intermediary server to execute the application in the remote access session, wherein executing the application comprises receiving the application from the application server;
receiving, by the computing device and via the remote access protocol, a representation of the application, wherein the representation of the application is generated by the intermediary server based on output of the application executing in the remote access session;
causing display of the representation of the application; and
sending, by the computing device and via the intermediary server, a fourth communication to the application server.

2. The method of claim 1, wherein causing display of the representation of the application comprises replacing output corresponding to the application executing at the computing device with second output corresponding to the representation of the application executing at the intermediary server.

3. The method of claim 1, wherein the second network conditions comprise a first round-trip time of the second communication and a second round-trip time of the third communication.

4. The method of claim 1, wherein the representation of the application comprises a video stream corresponding to output of the application executing on the intermediary server.

5. The method of claim 1, wherein comparing the first network conditions and the second network conditions comprises selecting the intermediary server from a plurality of intermediary servers is based on respective network conditions of each intermediary server of the plurality of intermediary servers.

6. The method of claim 1, wherein causing the intermediary server to execute the application comprises transmitting, to the intermediary server, session information associated with the application executing on the computing device.

7. The method of claim 1, wherein sending the fourth communication to the application server comprises:
sending a first indication of a user command to the intermediary server by the computing device, wherein the intermediary server is configured to send a second indication of the user command to the application server.

8. The method of claim 1, wherein causing the intermediary server to execute the application in the remote access session is further based on determining that the application will execute more quickly on the intermediary server.

9. A method comprising:
sending, by an intermediary server and to a computing device executing an application, network conditions, wherein the network conditions correspond to:
a first network connection, using a remote access protocol, between the intermediary server and the computing device, and
a second network connection, using a first protocol different from the remote access protocol, between the intermediary server and an application server, wherein the application server corresponds to the application;
receiving, from the computing device and based on a determination that a performance characteristic of the application would be improved by executing the application in a remote access session on the intermediary server, a request for the application;
executing, by the intermediary server and in the remote access session, the application, wherein the application is received from the application server;
processing the application executing at the intermediary server, wherein processing comprises generating a representation of the application based on output of the application executing in the remote access session; and
transmitting, via the remote access protocol, the representation of the application to the computing device.

10. The method of claim 9, further comprising:
receiving, from the computing device, an input command associated with the representation of the application; and
applying, by the intermediary server, the input command to the application executing at the intermediary server.

11. The method of claim 9, wherein receiving the request for the representation of the application comprises receiving, from the computing device, session information corresponding to the application executing at the computing device.

12. The method of claim 9, further comprising:
storing the network conditions, and
transmitting the network conditions to a second intermediary server.

13. The method of claim 12, wherein sending the network conditions further comprises sending, to the computing device, second network conditions corresponding to a third intermediary server, and wherein receiving the request for the application is further based on the second network conditions.

14. The method of claim 9, further comprising:
determining capabilities of the computing device,
wherein generating the representation of the application is based on the capabilities of the computing device.

15. A method comprising:
executing, by a computing device, an application, wherein the application is received by the computing device from an application server, and wherein executing the application comprises sending a first communication to the application server;
determining, based on the first communication, first network conditions corresponding to the application and associated with a first protocol;
determining second network conditions corresponding to communications between the computing device and an intermediary server using a remote access protocol different from the first protocol; and
in response to determining, based on a comparison of the first network conditions and the second network conditions, that a performance characteristic of the application would be improved by executing the application in a remote access session on the intermediary server:
causing the intermediary server to execute the application in the remote access session;
receiving, from the intermediary server and via the remote access protocol, a representation of the application, wherein the representation of the application is generated based on output corresponding to the application executing in the remote access session;
causing display of the representation of the application; and
sending, by the computing device and via the intermediary server, a second communication to the application server.

16. The method of claim 15, wherein determining the first network conditions comprises measuring transmission parameters associated with a third communication received from the application server.

17. The method of claim 15, wherein the comparison of the first network conditions and the second network conditions comprises determining that a first round-trip time of the first network conditions is greater than a second round-trip time of the second network conditions.

18. The method of claim 15, wherein the second network conditions correspond to:
a first network connection between the intermediary server and the computing device, and
a second network connection between the intermediary server and the application server.

19. The method of claim 15, wherein causing display of the representation of the application comprises replacing output corresponding to the application executing at the computing device with second output corresponding to the representation of the application executing at the intermediary server.

20. The method of claim 15, wherein causing the intermediary server to execute the application comprises transmitting, to the intermediary server, session information associated with the application executing on the computing device.

* * * * *